United States Patent
Kalhan

(10) Patent No.: US 11,337,171 B2
(45) Date of Patent: ***May 17, 2022

(54) DOWNLINK TIMING ADVANCED FOR COMMON SYNCHRONIZATION SIGNAL ACQUISITION

(71) Applicant: Kyocera Corporation, Kyoto (JP)

(72) Inventor: Amit Kalhan, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 108 days.

This patent is subject to a terminal disclaimer.

(21) Appl. No.: 16/771,505

(22) PCT Filed: Dec. 3, 2018

(86) PCT No.: PCT/US2018/063622
§ 371 (c)(1),
(2) Date: Jun. 10, 2020

(87) PCT Pub. No.: WO2019/125750
PCT Pub. Date: Jun. 27, 2019

(65) Prior Publication Data
US 2021/0076339 A1   Mar. 11, 2021

Related U.S. Application Data

(60) Provisional application No. 62/757,919, filed on Nov. 9, 2018, provisional application No. 62/607,216, filed on Dec. 18, 2017.

(51) Int. Cl.
*H04W 56/00* (2009.01)
*H04B 17/318* (2015.01)

(52) U.S. Cl.
CPC ........ *H04W 56/001* (2013.01); *H04B 17/318* (2015.01)

(58) Field of Classification Search
CPC .. H04W 56/001; H04B 17/318; H04J 11/0069
See application file for complete search history.

(56) References Cited

U.S. PATENT DOCUMENTS

| | | |
|---|---|---|
| 2009/0274077 A1 | 11/2009 | Meylan et al. |
| 2012/0258752 A1 | 10/2012 | Liao |

(Continued)

FOREIGN PATENT DOCUMENTS

| | | |
|---|---|---|
| EP | 2941066 B1 | 11/2015 |
| JP | 2001-016636 A | 1/2001 |

OTHER PUBLICATIONS

ZTE, ZTE Microelectronics; "SS sequence evaluation results and design," R1-1704357; 3GPP TSG-RAN Meeting #88bis; Apr. 3-7, 2017; Spokane, US.

(Continued)

*Primary Examiner* — Charles C Jiang
*Assistant Examiner* — Ryan C Kavleski

(57) ABSTRACT

A set of neighboring base stations coordinate to transmit a cell-specific common resynchronization signal via a Common Synchronization Channel (CSCH). At least one neighboring base station transmits the cell-specific common resynchronization signal by a timing advance value before a serving base station transmits the cell-specific common resynchronization signal. A user equipment (UE) device receives the cell-specific common resynchronization signals from the base stations and combines the received cell-specific common resynchronization signals. In some examples, the UE device coherently combines the received cell-specific common resynchronization signals. Once the received signal strength of the combined received cell-specific common resynchronization signals exceeds a (Continued)

threshold level, the UE device utilizes the combined received cell-specific common resynchronization signals to obtain resynchronization.

30 Claims, 6 Drawing Sheets

(56) References Cited

U.S. PATENT DOCUMENTS

| | | | |
|---|---|---|---|
| 2012/0307704 A1 | 12/2012 | Roman et al. | |
| 2014/0274019 A1 | 9/2014 | Batchu et al. | |
| 2014/0286286 A1 | 9/2014 | Yamazaki et al. | |
| 2016/0088579 A1* | 3/2016 | Harada | H04W 48/16 370/336 |
| 2016/0242103 A1* | 8/2016 | Mindru | H04L 27/2663 |
| 2019/0098589 A1* | 3/2019 | Chae | H04W 72/0446 |
| 2019/0141755 A1* | 5/2019 | Bai | H04W 24/02 |
| 2019/0230598 A1* | 7/2019 | Webb | H04L 5/0053 |
| 2021/0084602 A1* | 3/2021 | Kalhan | H04W 72/005 |
| 2021/0144043 A1* | 5/2021 | Sengupta | H04J 11/0073 |

OTHER PUBLICATIONS

Intel Corporation; "NR PBCH Design," R1-1704711; 3GPP TSG-RAN Meeting #88bis; Apr. 3-7, 2017; Spokane, US.

Huawei, Hisilicon; "Potential Advantages of multi-connectivity with multiple MAC entities within an NR cell," R2-1710271; 3GPP TSG-RAN WG2 Meeting #99bis; Oct. 9-13, 2017; Prague, CZ.

Ericsson; "Analysis of raster concepts for Frequency ranges 1 and 2," R4-1707742; 3GPP TSG-RAN WG4 Meeting #84; Aug. 21-25, 2017; Berlin, DE.

Huawei, Hisilicon; "Initial Evaluation Results for Initial Access," R1-1609438; 3GPP TSG-RAN WG1 Meeting #86bis; Oct. 1, 2016; Lisbon, PT.

Huawei, Hisilicon; "Network Synchronization for NR," R1-1611682; 3GPP TSG-RAN WG1 Meeting #87 Nov. 5, 2016; Reno, US.

* cited by examiner

DOWNLINK TIMING ADVANCED FOR COMMON SYNCHRONIZATION SIGNAL ACQUISITION

CLAIM OF PRIORITY

The present application claims priority to U.S. Provisional Application No. 62/607,216 filed on Dec. 18, 2017, and U.S. Provisional Application No. 62/757,919 filed on Nov. 9, 2018, and assigned to the assignee hereof.

FIELD

This invention generally relates to wireless communications and more particularly to user equipment device resynchronization.

BACKGROUND

In a wireless network, a user equipment (UE) device is required to maintain an accurate symbol timing synchronization with its serving base station. The network synchronization is needed for the UE device to correctly decode the downlink signals received from the serving base station. The UE device listens to the serving base station's synchronization signal to adjust the internal clock of the UE device to track the symbol and frame time boundaries.

In order to save power, the UE device periodically turns OFF its transceiver and enters a sleep state. The UE device periodically wakes up from the sleep state to check whether a page message was received from the serving base station. If the UE device receives a page, then the UE device remains ON to receive the subsequent control and data signals.

Obviously, the UE device reduces its battery-consumption the longer the UE device remains asleep. However, the UE device remaining in a long duration sleep state results in the UE device clock drifting away from the nominal timing value. Therefore, every time the UE device wakes up, the UE device must reacquire the symbol timing before checking the page message.

Typically, the UE device takes a longer time to resynchronize than the time required for the UE device to receive and decode the page message. This resynchronization time becomes a much larger overhead for the Machine-type-Communications (MTC) UE devices. For example, to achieve a long battery life (e.g., 10-15+ years), which is an important aspect for the MTC networks, the MTC devices have a much longer sleep-cycle.

In fact, the sleep-cycle of some MTC devices can be between several minutes and several hours. Such a long sleep results in much larger clock-drifts for the MTC UE device. In addition, the MTC devices may operate in deep coverage areas where the downlink received signal strength is very low. In extreme scenarios, the received signal strength at the MTC devices could be as low as Signal-to-noise ratio (SNR)=−14 dB.

Having a large clock-drift and receiving a signal at very low signal strength forces the MTC UE devices to take several hundreds of milliseconds to acquire the network timing upon waking up. The reason it takes such a long time to detect the correct timing is that an MTC UE device has to wait to receive and accumulate multiple repetitions of the synchronization signal, which the MTC UE device combines in order to achieve a higher SNR. For example, according to the existing MTC Long Term Evolution (LTE) standard, an MTC UE device would require approximately 80 Primary Synchronization Signal (PSS) or Secondary Synchronization Signal (SSS) subframes to acquire the network timing after waking up. With a PSS/SSS subframe transmitted every 5 ms, 80 PSS/SSS subframes=400 ms that are required for the MTC UE device to obtain resynchronization. After obtaining resynchronization, it only takes a couple of milliseconds for the MTC UE device to decode the Physical Downlink Control Channel (PDCCH) to check for a page message indication.

SUMMARY

A set of neighboring base stations coordinate to transmit a cell-specific common resynchronization signal via a Common Synchronization Channel (CSCH). At least one neighboring base station transmits the cell-specific common resynchronization signal by a timing advance value before a serving base station transmits the cell-specific common resynchronization signal. A user equipment (UE) device receives the cell-specific common resynchronization signals from the base stations and combines the received cell-specific common resynchronization signals. In some examples, the UE device coherently combines the received cell-specific common resynchronization signals. Once the received signal strength of the combined received cell-specific common resynchronization signals exceeds a threshold level, the UE device utilizes the combined received cell-specific common resynchronization signals to obtain resynchronization.

The neighboring base station transmits the cell-specific common resynchronization signal by a timing advance value before the serving base station transmits the cell-specific common resynchronization signal.

Figure 5:
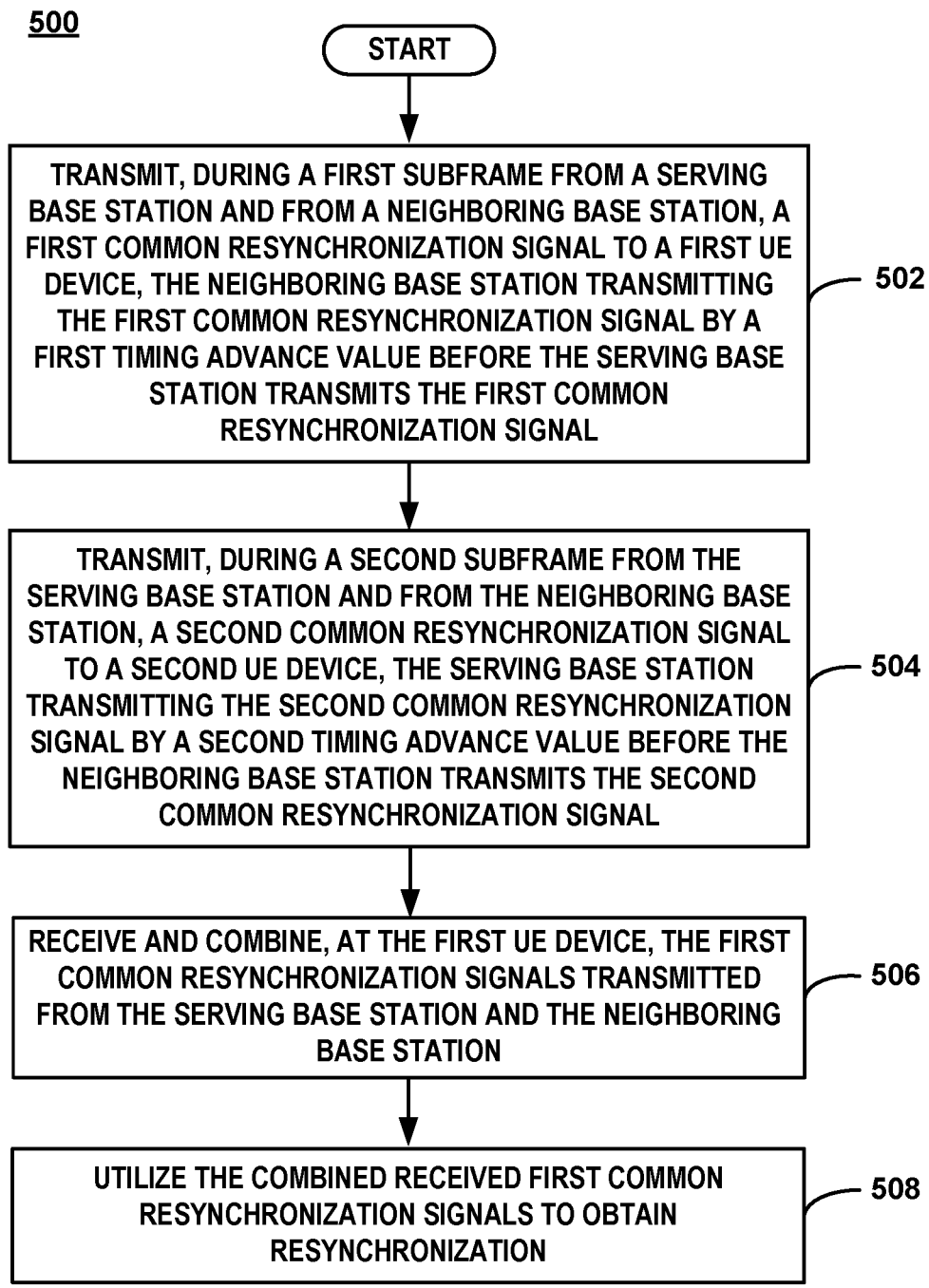

FIG. 5 is a flowchart of an example of a method in which a serving base station and a neighboring base station both transmit a first cell-specific common resynchronization signal during a first subframe. The neighboring base station transmits the first cell-specific common resynchronization signal by a first timing advance value before the serving base station transmits the first cell-specific common resynchronization signal. The serving base station and the neighboring base station both transmit a second cell-specific common resynchronization signal during a second subframe. The serving base station transmits the second cell-specific common resynchronization signal by a second timing advance value before the neighboring base station transmits the second cell-specific common resynchronization signal.

DETAILED DESCRIPTION

In order to reduce the resynchronization time required for Machine-type-Communications (MTC) user equipment (UE) devices to receive page messages, a set of neighboring base stations can coordinate to transmit a common resynchronization signal via a Common Synchronization Channel (CSCH). As used herein, the term "common" is intended to mean "the same." The MTC UE devices use the common resynchronization signal to obtain resynchronization (e.g., acquire the network timing after waking up). In some of the examples described herein, the common resynchronization signal is formed using a sequence with special autocorrelation/correlation properties suitable for synchronization signals, such as the Zadoff-Chu (ZC) sequence, for example.

The set of neighboring base stations all transmit the common resynchronization signal in the same predetermined specific time-frequency resource locations within a subframe/frame such that, when the MTC UE devices detect the common resynchronization signal correctly, the MTC UE devices become aware of the subframe boundaries and can obtain accurate symbol timing. Each MTC UE device receiver constructively combines the energy of the multiple copies of the received common resynchronization signal from the different base stations. The combined received common resynchronization signals have a much higher received power with a greater Signal-to-noise ratio (SNR), which improves the receiver performance and results in a much faster resynchronization.

If the set of neighboring base stations are time aligned with respect to the subframe numbers, then, after acquiring the common resynchronization signal correctly, the UE devices also become aware of the subframe and the frame number. Otherwise, the UE device will acquire additional signals to determine the subframe/frame number, which is discussed more fully below.

In comparison to the legacy Primary Synchronization Signal (PSS)-based resynchronization, the CSCH-based resynchronization takes much less time for the UE devices to resynchronize with their respective serving cells. For example, the same common resynchronization signal is broadcast, via the CSCH, by the set of neighboring cells in the same resource, which does not cause any inter-cell interference, and as mentioned above, the combined received signal strength at the MTC UE receiver has a much higher SNR. Since acquisition time is a direct function of the signal strength of the resynchronization signal, a stronger received signal strength results in a much faster resynchronization. Thus, the time for the MTC UE device to acquire resynchronization via CSCH-based resynchronization is much shorter than the time required for the MTC UE device to acquire resynchronization via PSS-based resynchronization. Moreover, the CSCH-based resynchronization has a much smaller overhead relative to the time required to decode the Physical Downlink Control Channel (PDCCH) to check for a page message indication.

However, when multiple base stations broadcast the common resynchronization signal via the CSCH, the MTC UE device receives the multiple common resynchronization signal transmissions as a large number of strong multipath signals with a wide delay-spread power profile. The wide delay-spread power profile increases the path-diversity effect, resulting in lower false detection probability. However, the timing-accuracy could degrade because many of the received multipath signals have a larger delay than the typical transmissions received from a single cell/base station. The delayed multipath signals with a longer average delay are most likely from one or more far-off neighboring base stations.

In one implementation, the receiver of the MTC UE device could select a wider detection window size to capture a greater number of significant multipath signals of the received common resynchronization signals. However, there is a trade-off between the timing-accuracy and acquisition-latency. A wider-sized detection window is used to obtain faster acquisition at the expense of greater timing inaccuracy. On the other hand, a smaller detection window captures much stronger multipath signals, resulting in smaller timing inaccuracy but requiring a larger number of detection attempts.

In the examples described herein, a neighboring base station transmits a cell-specific common resynchronization signal via a first cell-specific Common Synchronization Channel (CSCH) by a timing advance (TA) value (e.g., a small amount of time) before the serving base station transmits the cell-specific common resynchronization signal via the first cell-specific CSCH. As a result, the MTC UE device receives the TA-adjusted first cell-specific CSCH multipath signals (e.g., common resynchronization signals) from the neighboring base station at approximately the same time the MTC UE device receives the first cell-specific CSCH multipath signals from its own serving base station. This allows the receiver of the MTC UE device to use a smaller-sized detection window, achieving a greater timing accuracy resynchronization with lower latency (e.g., fewer number of detection attempts).

Figure 1A:
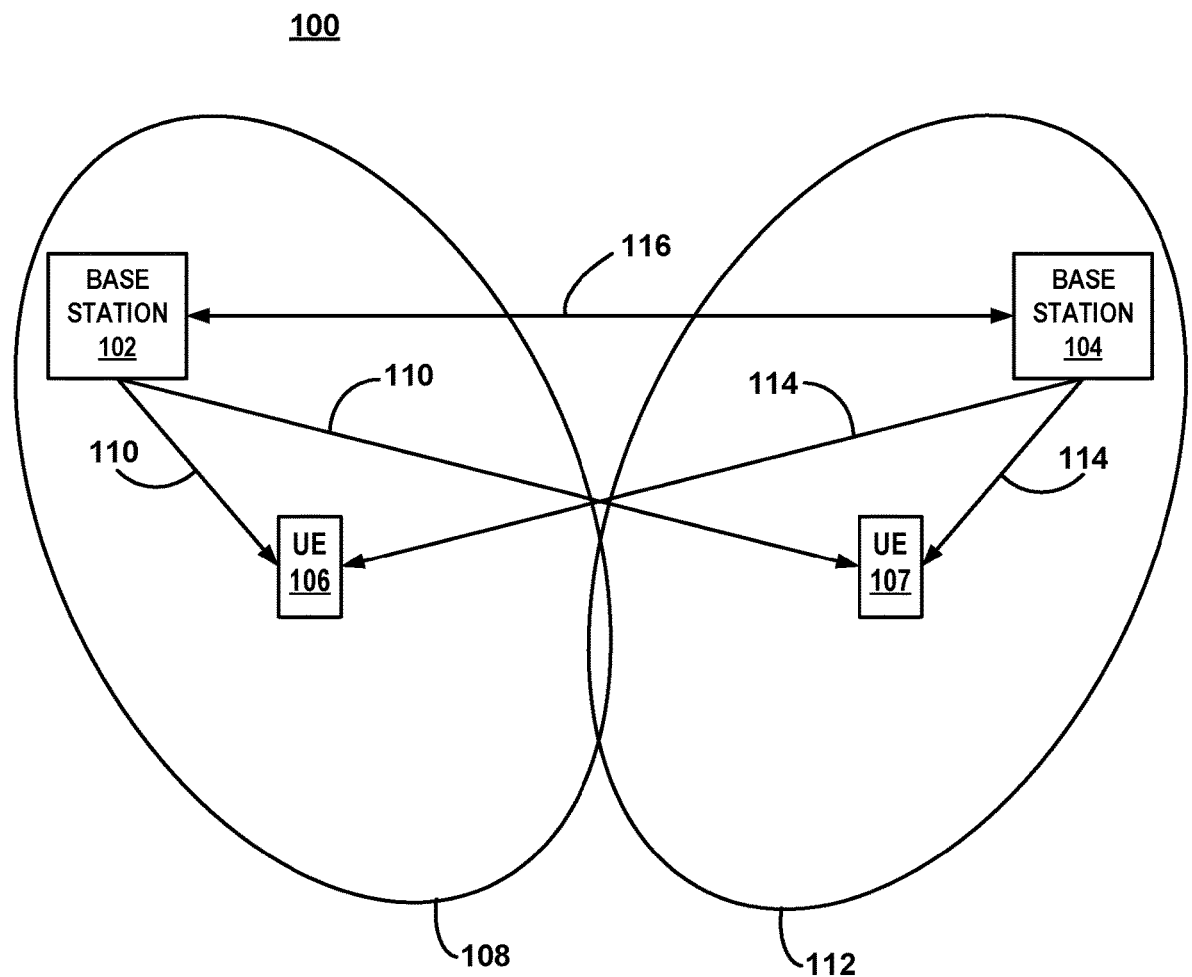
FIG. 1A is a block diagram of a communication system for an example in which a serving base station and a neighboring base station both transmit a cell-specific common resynchronization signal. The neighboring base station transmits the cell-specific common resynchronization signal by a timing advance value before the serving base station transmits the cell-specific common resynchronization signal.

FIG. 1A is a block diagram of a communication system for an example in which a serving base station and a neighboring base station both transmit a cell-specific common resynchronization signal. The neighboring base station transmits the cell-specific common resynchronization signal by a timing advance value before the serving base station transmits the cell-specific common resynchronization signal. The communication system 100 is part of a radio access network (not shown) that provides various wireless services to UE devices that are located within the respective service areas of the various base stations that are part of the radio access network.

In the interest of clarity and brevity, communication system 100 is shown as having only base station 102 and base station 104. However, in other examples, communication system 100 could have any suitable number of base stations. In the example of FIG. 1A, at least a portion of the service area (cell) for base station 102 is represented by cell 108, and at least a portion of the service area (cell) for base station 104 is represented by cell 112. Cells 108, 112 are represented by ovals, but a typical communication system 100 would have a plurality of cells, each having variously shaped geographical service areas.

Base stations 102, 104, sometimes referred to as eNodeBs or eNBs, communicate with the wireless user equipment (UE) devices 106, 107 by respectively transmitting downlink signals 110, 114 to the UE devices 106, 107. In the case of implementations that utilize the 5G New Radio air interface, the base station is sometimes referred to as a gNB. Base stations 102, 104 also receive uplink signals (not shown) transmitted from the UE devices 106, 107, respectively. As used herein, the terms "base station" and "cell" are interchangeable. In some cases, the serving cell is provided by a first base station, and the neighboring cell is provided by a second base station. However, in other cases, a serving cell and a neighboring cell may be provided by the same base station.

Figure 2A:
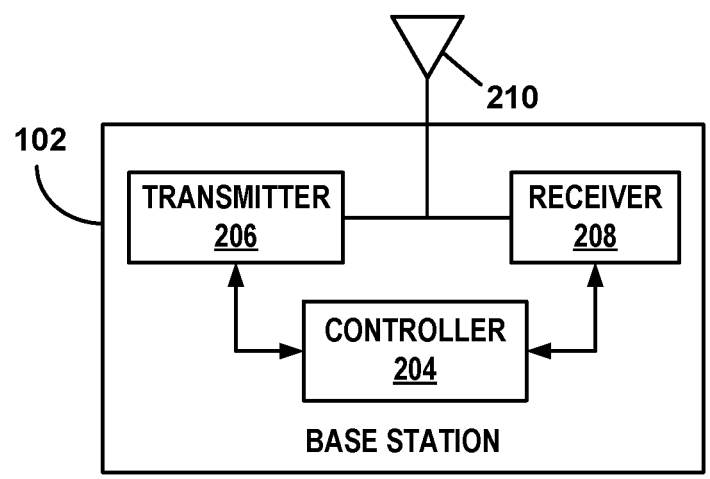
FIG. 2A is a block diagram of an example of the base stations shown in FIGS. 1A and 1B.

Base stations 102, 104 are connected to the network through a backhaul (not shown) in accordance with known techniques. As shown in FIG. 2A, base station 102 comprises controller 204, transmitter 206, and receiver 208, as well as other electronics, hardware, and code. Although FIG. 2A specifically depicts the circuitry and configuration of base station 102, the same base station circuitry and configuration is utilized for base station 104 in the example shown in FIG. 1A. In other examples, either of the base stations may have circuitry and/or a configuration that differs from that of the base station 102 shown in FIG. 2A.

The base station 102 is any fixed, mobile, or portable equipment that performs the functions described herein. The various functions and operations of the blocks described with reference to the base station 102 may be implemented in any number of devices, circuits, or elements. Two or more of the functional blocks may be integrated in a single device, and the functions described as performed in any single device may be implemented over several devices.

For the example shown in FIG. 2A, the base station 102 may be a fixed device or apparatus that is installed at a particular location at the time of system deployment. Examples of such equipment include fixed base stations or fixed transceiver stations. In some situations, the base station 102 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, the base station 102 may be a portable device that is not fixed to any particular location. Accordingly, the base station 102 may be a portable user device such as a UE device in some circumstances.

The controller 204 includes any combination of hardware, software, and/or firmware for executing the functions described herein as well as facilitating the overall functionality of the base station 102. An example of a suitable controller 204 includes code running on a microprocessor or processor arrangement connected to memory. The transmitter 206 includes electronics configured to transmit wireless signals. In some situations, the transmitter 206 may include multiple transmitters. The receiver 208 includes electronics configured to receive wireless signals. In some situations, the receiver 208 may include multiple receivers. The receiver 208 and transmitter 206 receive and transmit signals, respectively, through an antenna 210. The antenna 210 may include separate transmit and receive antennas. In some circumstances, the antenna 210 may include multiple transmit and receive antennas.

The transmitter 206 and receiver 208 in the example of FIG. 2A perform radio frequency (RF) processing including modulation and demodulation. The receiver 208, therefore, may include components such as low noise amplifiers (LNAs) and filters. The transmitter 206 may include filters and amplifiers. Other components may include isolators, matching circuits, and other RF components. These components in combination or cooperation with other components perform the base station functions. The required components may depend on the particular functionality required by the base station.

The transmitter 206 includes a modulator (not shown), and the receiver 208 includes a demodulator (not shown). The modulator modulates the signals to be transmitted as part of the downlink signals 110 and can apply any one of a plurality of modulation orders. The demodulator demodulates any uplink signals received at the base station 102 in accordance with one of a plurality of modulation orders.

Returning to FIG. 1A, the communication system 100 provides various wireless services to UE devices 106, 107 via base stations 102, 104. For the examples herein, the communication system 100 operates in accordance with at least one revision of the 3rd Generation Partnership Project Long Term Evolution (3GPP LTE) communication specification. In other examples, the communication system 100 operates in accordance with at least one revision of the 5G New Radio communication specification.

For the examples herein, the systems and methods will be described mainly from the perspective of UE device 106. Thus, any references to the "serving base station" are intended to refer to base station 102, which is the serving base station for UE device 106, unless stated otherwise. Similarly, any references to the "neighboring base station" are intended to refer to base station 104, which is a neighboring base station for UE device 106, unless stated otherwise. However, it should be understood that any of the features, functionality, etc. of UE device 106 are also applicable to UE device 107, to which base station 104 is the serving base station and base station 102 is the neighboring base station.

Figure 2B:
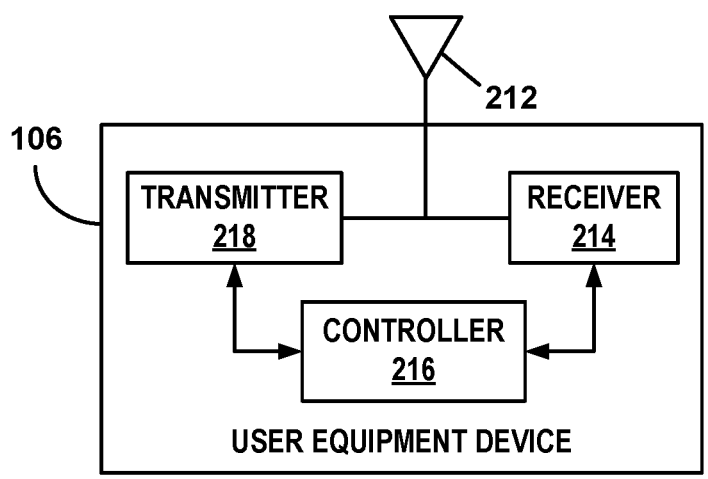
FIG. 2B is a block diagram of an example of the UE devices shown in FIGS. 1A and 1B.

UE device 106 is served by serving base station 102 and, thus, receives downlink signals 110 via antenna 212 and receiver 214, as shown in FIG. 2B. Besides antenna 212 and receiver 214, UE device 106 further comprises controller 216 and transmitter 218, as well as other electronics, hardware, and code. Although FIG. 2B specifically depicts the circuitry and configuration of UE device 106, the same UE device circuitry and configuration is utilized for UE device 107 in communication system 100. In other examples, either of the UE devices may have circuitry and/or a configuration that differs from that of the UE device 106 shown in FIG. 2B.

In the example shown in FIG. 1A, the communication link between the UE device 106 and the base station (eNB) 102 is a Uu link, which is configured to provide downlink communication from the base station 102 to the UE device 106 and to provide uplink communication from the UE device 106 to the base station 102. A similar communication link exists between UE device 107 and the base station 104.

In some examples, the UE devices 106, 107 are any wireless communication devices such as a mobile phone, a transceiver modem, a personal digital assistant (PDA), a tablet, or a smartphone. In other examples, UE devices 106, 107 are MTC UE devices. Thus, the UE devices 106, 107 are any fixed, mobile, or portable equipment that performs the functions described herein. The various functions and operations of the blocks described with reference to UE device 106 may be implemented in any number of devices, circuits, or elements. Two or more of the functional blocks may be integrated in a single device, and the functions described as performed in any single device may be implemented over several devices.

The controller 216 includes any combination of hardware, software, and/or firmware for executing the functions described herein as well as facilitating the overall functionality of a UE device. An example of a suitable controller 216 includes code running on a microprocessor or processor arrangement connected to memory. The transmitter 218 includes electronics configured to transmit wireless signals. In some situations, the transmitter 218 may include multiple transmitters. The receiver 214 includes electronics configured to receive wireless signals. In some situations, the receiver 214 may include multiple receivers. The receiver 214 and transmitter 218 receive and transmit signals, respectively, through antenna 212. The antenna 212 may include separate transmit and receive antennas. In some circumstances, the antenna 212 may include multiple transmit and receive antennas.

The transmitter 218 and receiver 214 in the example of FIG. 2B perform radio frequency (RF) processing including modulation and demodulation. The receiver 214, therefore, may include components such as low noise amplifiers (LNAs) and filters. The transmitter 218 may include filters and amplifiers. Other components may include isolators, matching circuits, and other RF components. These components in combination or cooperation with other components perform the UE device functions. The required components may depend on the particular functionality required by the UE device.

The transmitter 218 includes a modulator (not shown), and the receiver 214 includes a demodulator (not shown). The modulator can apply any one of a plurality of modulation orders to modulate the signals to be transmitted as part of the uplink signals (not shown). The demodulator demodulates the downlink signals 110, 114 in accordance with one of a plurality of modulation orders.

In operation, the UE device 106 is served by base station 102. Thus, upon receipt of the downlink signals 110, the UE device 106 demodulates the downlink signals 110, which yields encoded data packets that contain data pertaining to at least one of the wireless services that the serving base station 102 is providing to the UE device 106. The UE device 106 decodes the encoded data packets, using controller 216, to obtain the data.

In the example shown in FIG. 1A, a set of neighboring base stations 102, 104 coordinate to transmit a first cell-specific common resynchronization signal via a first Common Synchronization Channel (CSCH). The base stations 102, 104 coordinate via communication link 116, which can be a wired connection (e.g., X2) or a wireless connection. For example, the base stations 102, 104 coordinate with each other regarding (1) the common sequence that will be transmitted as part of the first cell-specific common resynchronization signal by both base stations 102, 104, and (2) the common set of time/frequency resources that will be utilized by both base stations 102, 104 to transmit the first cell-specific common resynchronization signal. In some examples, the common set of time/frequency resources are predetermined Multimedia Broadcast Single Frequency Network (MBSFN) subframes.

For the example shown in FIG. 1A, the first cell-specific common resynchronization signal is specific to base station 102. In order to increase the chances that the UE device 106 receives the first cell-specific common resynchronization signals from the neighboring base station 104 at approximately the same time that the UE device 106 receives the first cell-specific common resynchronization signals from its own serving base station 102, the neighboring base station 104 transmits the first cell-specific common resynchronization signal by a timing advance value before the serving base station 102 transmits the first cell-specific common resynchronization signal.

In some examples, the serving base station 102 may broadcast, via its transmitter 206 and antenna 210, information required by UE device 106 to receive the first cell-specific common resynchronization signal from the serving base station 102 and the neighboring base station 104. The broadcast information may, in some examples, include time/frequency resource location information for the CSCH over which the first cell-specific common resynchronization signal will be transmitted and/or information regarding the common sequence that will be included within the first cell-specific common resynchronization signal. However, in other examples, the serving base station 102 may not have to broadcast information regarding the common sequence if the common sequence is a known, fixed value or has been previously configured. Similarly, the time/frequency resource location for the CSCH may not need to be broadcast if the CSCH is broadcasted periodically and all the UE devices being served by the base station 102 are aware of the periodicity of the CSCH broadcast. In some examples, the broadcast information is broadcast by base station 102 in a System Information Block (SIB) message to UE device 106.

Figure 3A:
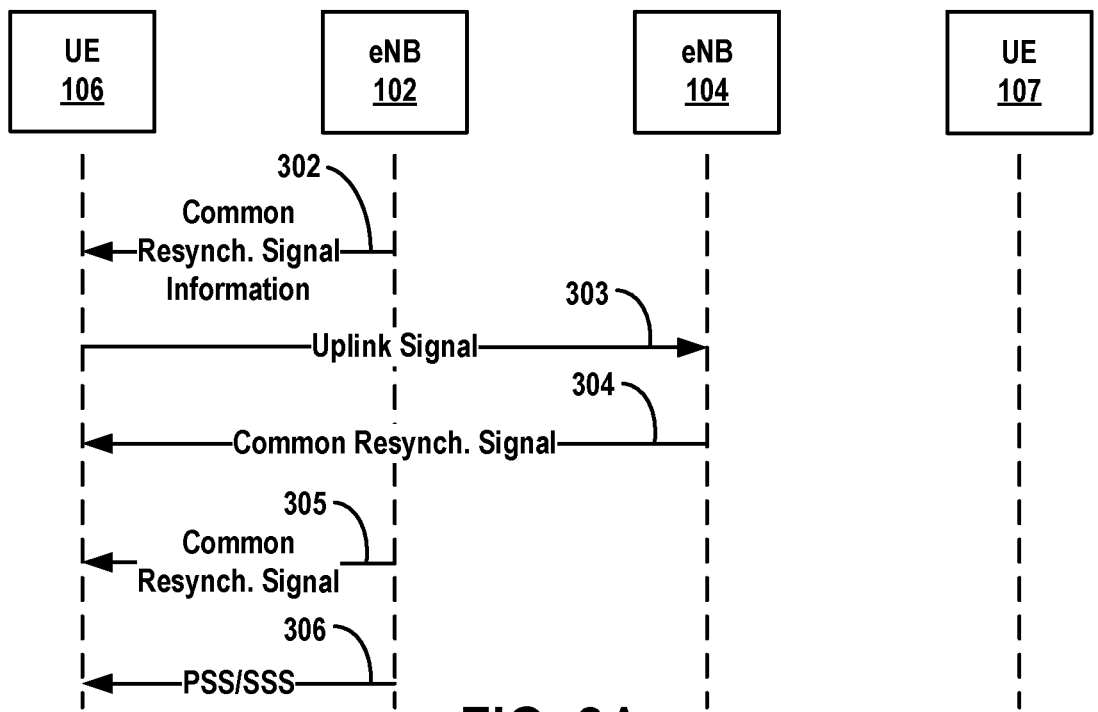
FIG. 3A is a messaging diagram of an example of the messages exchanged between the various system components shown in FIG. 1A.

The UE device 106 receives the broadcast information via its antenna 212 and receiver 214. The UE device 106 utilizes the broadcast information to receive and decode the first cell-specific common resynchronization signal that will be transmitted by its serving base station 102 and the neighboring base station 104. If there are other UE devices in cell 108, the other UE devices may also receive the broadcast information and utilize it to receive the first cell-specific common resynchronization signal that will be transmitted by base station 102 and base station 104. In FIG. 3A, the signal that represents base station 102 broadcasting information required by UE device 106 to receive the first cell-specific common resynchronization signal is represented by signal 302.

In some examples, which are discussed more fully below in connection with FIG. 1B, base station 104 may also broadcast information, similar to the information broadcast by base station 102, which is required by UE device 107 to receive a second cell-specific common resynchronization signal from base station 102 and base station 104. The second cell-specific common resynchronization signal is specific to base station 104. In these cases, the UE device 107 receives the broadcast information via its antenna 212 and receiver 214. The UE device 107 utilizes the broadcast information to receive and decode the second cell-specific common resynchronization signal that will be transmitted by base station 102 and base station 104. If there are other UE devices in cell 112, the other UE devices may also receive the broadcast information and utilize it to receive the second cell-specific common resynchronization signal that will be transmitted by base station 102 and base station 104.

In the example of FIG. 1A, the UE device 106 wakes up from a sleep state to check for a page message from the serving base station 102. Upon waking, the UE device 106 warms up its transceiver (e.g., transmitter 218 and receiver 214) and attempts to obtain resynchronization before checking the Physical Downlink Control Channel (PDCCH) for a page message indication. In order to help the UE device 106 obtain resynchronization, the serving base station 102 transmits, via its transmitter 206 and antenna 210, a first cell-specific common resynchronization signal to UE device 106. Neighboring base station 104 also transmits, via its transmitter 206 and antenna 210, the first cell-specific common resynchronization signal to the UE device 106, which is being served by serving base station 102.

The neighboring base station 104 transmits the first cell-specific common resynchronization signal by a timing advance value before the serving base station 102 transmits the first cell-specific common resynchronization signal. For example, base station 104 would transmit the first cell-specific common resynchronization signal, via downlink signal 114, to UE device 106, by a timing advance value (e.g., a small amount of time) before base station 102 transmits the first cell-specific common resynchronization signal, via downlink signal 110, to UE device 106.

In some examples, the average delay between the time when UE device 106 receives the multipath signals (e.g., common resynchronization signals) from base station 104 and the time when UE device 106 receives the multipath signals from base station 102 is utilized as the timing advance value by which base station 104 should transmit the first cell-specific common resynchronization signal before base station 102 transmits the first cell-specific common resynchronization signal. The timing advance value may, in some cases, be determined dynamically by base station 104 before transmitting the first cell-specific common resynchronization signal.

In order to dynamically determine the timing advance value, the neighboring base station 104 measures an uplink signal received from UE device 106, which is located in the service area (e.g., cell 108) of base station 102. Based on one or more signal characteristics (e.g., received signal strength) of the received uplink signal, the neighboring base station 104 utilizes its controller 204 to determine the timing advance value. The uplink signal may be any suitable signal that enables the neighboring base station 104 to determine the timing advance value. In order to facilitate reception of the uplink signal by neighboring base station 104, base station 102 coordinates with neighboring base station 104 to provide information (e.g., a device identifier for UE device 106, time/frequency for the uplink signal transmission, etc.) required by neighboring base station 104 to receive the uplink signal. In FIG. 3A, the signal that represents UE device 106 transmitting the uplink signal that is utilized by the neighboring base station 104 to determine the timing advance value is represented by signal 303.

In other cases, the timing advance value is determined as part of the deployment of one or more fixed UE devices and/or base stations. For example, if a neighboring base station 104 is already aware of the distance between the neighboring base station 104 and a location of one or more MTC UE devices 106 (e.g., smart meters in a residential neighborhood, parking meters in an underground parking lot, etc.), the neighboring base station 104 can apply a known, fixed timing advance value, based on the distance between the neighboring base station 104 and the MTC UE devices 106, when transmitting the first cell-specific common resynchronization signal to the fixed MTC UE devices 106. This known, fixed timing advance (TA) value can be determined as part of the deployment parameters (e.g., when deploying the fixed MTC UE devices and/or neighboring base station). For example, if the neighboring base station's distance, d, from the interested region (e.g., the location of the fixed MTC UE device(s)) is known, then TA=d/c−CP_duration, where c is the speed of light and CP_duration is the duration of the cyclic prefix used for the first cell-specific common resynchronization signal transmissions.

Regardless of the manner in which the timing advance (TA) value is determined, the neighboring base station 104 transmits, via its transmitter 206 and antenna 210, the first cell-specific common resynchronization signal to UE device 106 by the timing advance value before the serving base station 102 transmits, via its transmitter 206 and antenna 210, the first cell-specific common resynchronization signal to the UE device 106. As a result, UE device 106 receives the TA-adjusted first cell-specific common resynchronization signals (e.g., multipath signals) from the neighboring base station 104 at approximately the same time that the UE device 106 receives the first cell-specific common resynchronization signals (e.g., multipath signals) from serving base station 102. This allows the receiver 214 of the UE device 106 to use a smaller-sized detection window, achieving a greater timing accuracy resynchronization with lower latency (e.g., fewer number of detection attempts).

The neighboring base station 104 transmission of the first cell-specific common resynchronization signal is represented by signal 304 in FIG. 3A. The serving base station 102 transmission of the first cell-specific common resynchronization signal is represented by signal 305 in FIG. 3A. The examples in which base station 102 and base station 104 also transmit the second cell-specific common resynchronization signal to UE device 107 are discussed more fully below in connection with FIG. 1B.

The first cell-specific common resynchronization signal transmitted by the serving base station 102 and the first cell-specific common resynchronization signal transmitted by the neighboring base station 104 both include (e.g., utilize) a common sequence. As mentioned above, the common sequence can be any sequence with special auto-correlation/correlation properties suitable for synchronization signals, such as the Zadoff-Chu (ZC) sequence, for example. In the example shown in FIG. 1A, the transmission of the first cell-specific common resynchronization signal from the serving base station 102 and the transmission of the first cell-specific common resynchronization signal from the neighboring base station 104 both utilize a common set of time/frequency resources.

In some examples, the transmitter 206 of the serving base station 102 is configured to boost the transmit power of the first cell-specific common resynchronization signal transmission from the serving base station 102. Similarly, in some examples, the transmitter 206 of the neighboring base station 104 is configured to boost the transmit power of the first cell-specific common resynchronization signal transmission from the neighboring base station 104.

The UE device 106 receives, via its antenna 212 and receiver 214, the first cell-specific common resynchronization signal transmitted from the serving base station 102 and the first cell-specific common resynchronization signal transmitted from the neighboring base station 104. The controller 216 of the UE device 106 combines the received first cell-specific common resynchronization signals and utilizes the combined received first cell-specific common resynchronization signals to obtain resynchronization. In some examples, the controller 216 of the UE device 106 coherently combines the received first cell-specific common resynchronization signals, which means that the controller 216 of the UE device 106 utilizes a timing mechanism (e.g., carrier phase information) to receive and then combine the received first cell-specific common resynchronization signals.

In other examples, the serving base station 102 also sends the configuration information to the UE device 106, via SIB messaging, with a minimum Signal-to-noise ratio (SNR) threshold value that must be met by the received signal strength of the combined received first cell-specific common resynchronization signals in order to utilize the first cell-specific common resynchronization signals to obtain resynchronization. Once the received signal strength of the combined received first cell-specific common resynchronization signals results in an SNR that is sufficient to obtain resynchronization, the UE device 106 will have the correct network timing required to successfully receive and decode the PDCCH to check for a page message indication. If the UE device 106 does not receive a page from the serving base station 102, then the UE device 106 turns OFF its transceiver and re-enters a sleep state. If the UE device 106 does receive a page from the serving base station 102, then the UE device 106 remains ON to receive the subsequent control and data signals.

In the cases in which the controller 216 of the UE device 106 determines that the combined received signal strength value of the combined received first cell-specific common resynchronization signals is below a signal strength threshold value (e.g., below a minimum SNR value), the controller 216 of the UE device 106 will utilize a Primary Synchronization Signal of the serving base station 102 and/or a Secondary Synchronization Signal of the serving base station 102 to obtain resynchronization.

In some examples, after obtaining resynchronization, the controller 216 of the UE device 106 utilizes a Primary Synchronization Signal (PSS) of the serving base station 102 and/or a Secondary Synchronization Signal (SSS) of the serving base station 102 to obtain an identifier associated with the serving base station 102. The signal containing the PSS/SSS transmitted from the serving base station 102 to the UE device 106 is represented by signal 306 in FIG. 3A.

Although the foregoing discussion only included two base stations 102, 104 in the set of base stations that coordinate transmission of the first cell-specific common resynchronization signal, communication system 100 may include any suitable number of base stations that can all coordinate with each other to transmit the first cell-specific common resynchronization signal. In examples in which there are multiple neighboring base stations transmitting the first cell-specific common resynchronization signal to a UE device 106 being served by serving base station 102, each neighboring base station may have its own unique timing advance value that is used when transmitting the first cell-specific common resynchronization signal.

In other examples, a first set of base stations (e.g., the serving base station 102 and the neighboring base station 104) may be assigned to a first Common Synchronization Channel (CSCH) area that utilizes a first common sequence, and a second set of base stations (not shown) may be assigned to a second CSCH area that utilizes a second common sequence that is different than the first common sequence.

Figure 1B:
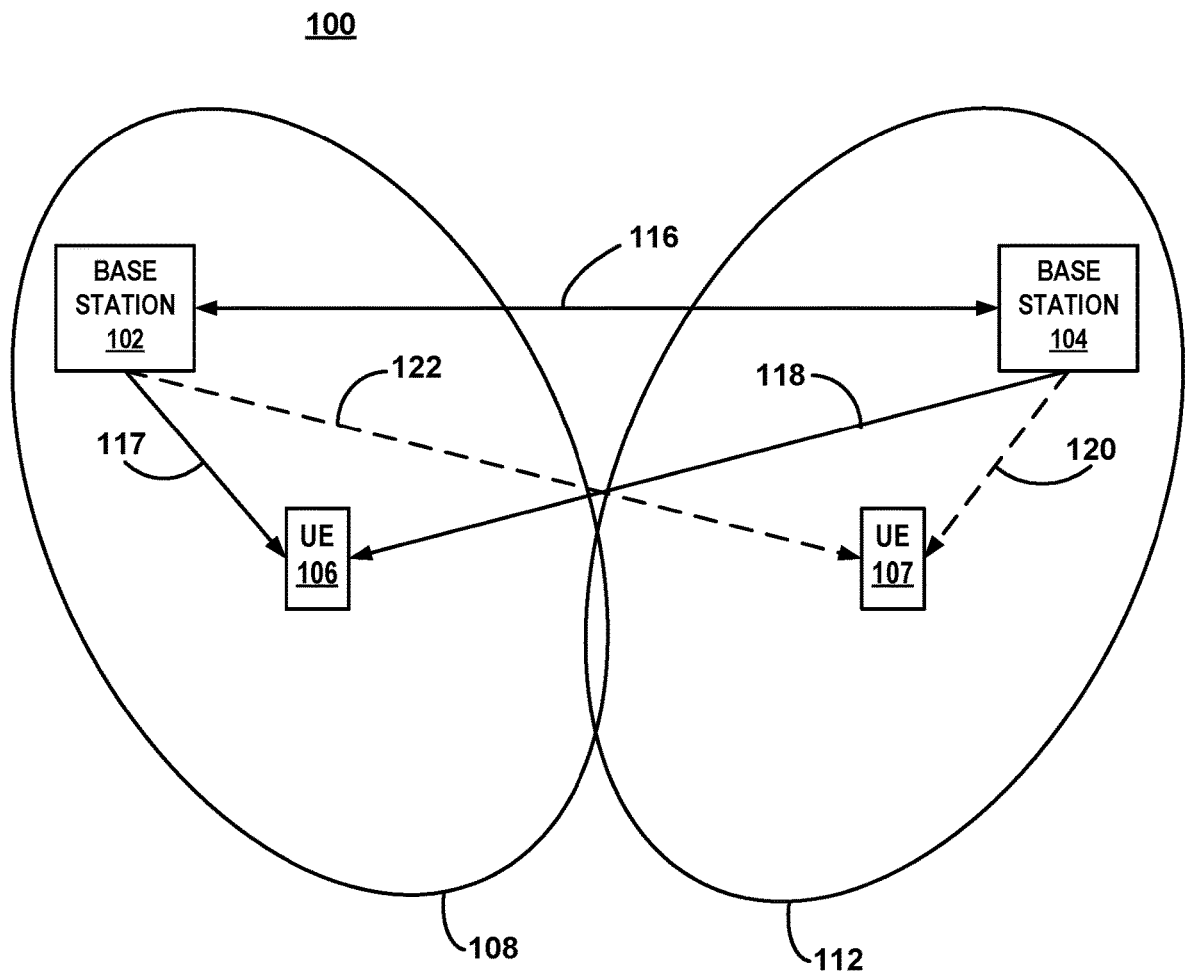
FIG. 1B is a block diagram of a communication system for an example in which a serving base station and a neighboring base station both transmit a first cell-specific common resynchronization signal during a first subframe. The neighboring base station transmits the first cell-specific common resynchronization signal by a first timing advance value before the serving base station transmits the first cell-specific common resynchronization signal. The serving base station and the neighboring base station both transmit a second cell-specific common resynchronization signal during a second subframe. The serving base station transmits the second cell-specific common resynchronization signal by a second timing advance value before the neighboring base station transmits the second cell-specific common resynchronization signal.

In the example shown in FIG. 1B, a set of neighboring base stations 102, 104 coordinate to transmit (1) a first cell-specific common resynchronization signal via a first cell-specific Common Synchronization Channel (CSCH) during a first subframe, utilizing a first common set of time/frequency resources, and (2) a second cell-specific common resynchronization signal via a second cell-specific CSCH during a second subframe, utilizing a second common set of time/frequency resources. The base stations 102, 104 coordinate transmission of the first and second cell-specific common resynchronization signals via communication link 116, which can be a wired connection (e.g., X2) or a wireless connection. For example, the base stations 102, 104 coordinate with each other regarding (1) the first common sequence that will be transmitted as part of the first cell-specific common resynchronization signal by both base stations 102, 104, (2) the second common sequence that will be transmitted as part of the second cell-specific common resynchronization signal by both base stations 102, 104, (3) the first common set of time/frequency resources that will be utilized by both base stations 102, 104 to transmit the first cell-specific common resynchronization signal, and (4) the second common set of time/frequency resources that will be utilized by both base stations 102, 104 to transmit the second cell-specific common resynchronization signal.

The first cell-specific common resynchronization signal is specific to base station 102, and the second cell-specific common resynchronization signal is specific to base station 104. As described above, the neighboring base station 104 transmits the first cell-specific common resynchronization signal by a first timing advance value before the serving base station 102 transmits the first cell-specific common resynchronization signal, and base station 102 transmits the second cell-specific common resynchronization signal by a second timing advance value before base station 104 transmits the second cell-specific common resynchronization signal.

Although the example shown in FIG. 1B utilizes different common sequences to differentiate the first and second cell-specific common resynchronization signals, in other examples, a first cell-specific common resynchronization signal may be a Primary Synchronization Signal (PSS) of a first base station (e.g., base station 102) that is transmitted by both the first base station and a second base station (e.g., base station 104) during a first subframe. Likewise, a second cell-specific common resynchronization signal may be a Primary Synchronization Signal (PSS) of a second base station (e.g., base station 104) that is transmitted by both the first base station and the second base station during a second subframe.

Returning to the example shown in FIG. 1B, the first common sequence is different than the second common sequence. For example, the first common sequence includes a first identifier that is associated with base station 102, and the second common sequence includes a second identifier that is associated with base station 104. The first common set of time/frequency resources is also different than the second common set of time/frequency resources. Moreover, in some examples, the first common set of time/frequency resources and the second common set of time/frequency resources are predetermined Multimedia Broadcast Single Frequency Network (MBSFN) subframes.

The serving base station 102 may also broadcast, via its transmitter 206 and antenna 210, information required by UE device 106 to receive the first cell-specific common resynchronization signal from the serving base station 102 and the neighboring base station 104 during the first subframe. The broadcast information may, in some examples, include time/frequency resource location information for the first cell-specific CSCH over which the first cell-specific common resynchronization signal will be transmitted and/or information regarding the first common sequence that will be included within the first cell-specific common resynchronization signal. However, in other examples, the serving base station 102 may not have to broadcast information regarding the first common sequence if the first common sequence is a known, fixed value or has been previously configured. Similarly, the time/frequency resource location for the first cell-specific CSCH may not need to be broadcast if the first cell-specific CSCH is broadcasted periodically and all the UE devices being served by the serving base station 102 are aware of the periodicity of the first cell-specific CSCH broadcast. In some examples, the broadcast information is broadcast by base station 102 in a System Information Block (SIB) message to UE device 106.

Figure 3B:
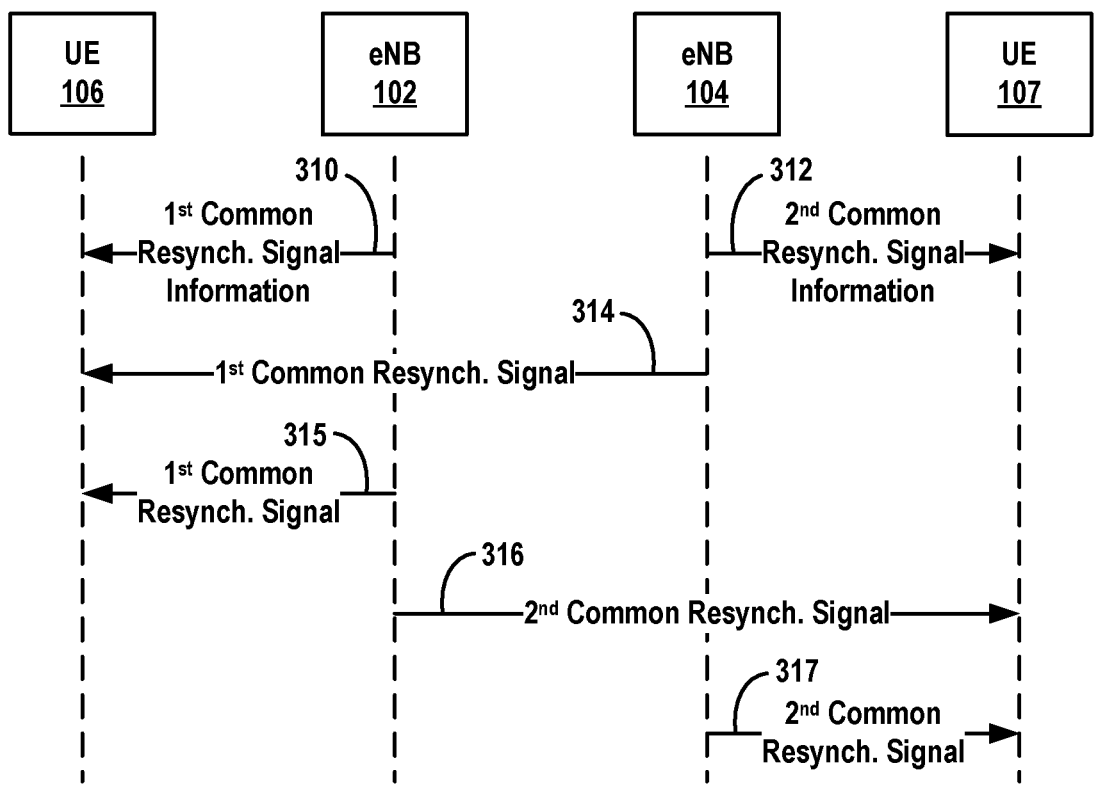
FIG. 3B is a messaging diagram of an example of the messages exchanged between the various system components shown in FIG. 1B.

The UE device 106 receives, via its antenna 212 and receiver 214, the broadcast information from base station 102. The UE device 106 utilizes the broadcast information to receive and decode the first cell-specific common resynchronization signal that will be transmitted by its serving base station 102 and the neighboring base station 104 during the first subframe. If there are other UE devices in cell 108, the other UE devices may also receive the broadcast information and utilize it to receive the first cell-specific common resynchronization signal that will be transmitted by base station 102 and base station 104 during the first subframe. In FIG. 3B, the signal that represents base station 102 broadcasting information required by UE device 106 to receive the first cell-specific common resynchronization signal is represented by signal 310.

Base station 104 may also broadcast, via its transmitter 206 and antenna 210, information required by UE device 107 to receive the second cell-specific common resynchronization signal from its base station 104 and base station 102 during the second subframe. The broadcast information may, in some examples, include time/frequency resource location information for the second cell-specific CSCH over which the second cell-specific common resynchronization signal will be transmitted and/or information regarding the second common sequence that will be included within the second cell-specific common resynchronization signal. However, in other examples, the base station 104 may not have to broadcast information regarding the second common sequence if the second common sequence is a known, fixed value or has been previously configured. Similarly, the time/frequency resource location for the second cell-specific CSCH may not need to be broadcast if the second cell-specific CSCH is broadcasted periodically and all the UE devices being served by base station 104 are aware of the periodicity of the second cell-specific CSCH broadcast. In some examples, the broadcast information is broadcast by base station 104 in a System Information Block (SIB) message to UE device 107.

The UE device 107 receives, via its antenna 212 and receiver 214, the broadcast information from base station 104. The UE device 107 utilizes the broadcast information to receive and decode the second cell-specific common resynchronization signal that will be transmitted by its base station 104 and base station 102 during the second subframe. If there are other UE devices in cell 112, the other UE devices may also receive the broadcast information and utilize it to receive the second cell-specific common resynchronization signal that will be transmitted by base station 104 and base station 102 during the second subframe. In FIG. 3B, the signal that represents base station 104 broadcasting information required by UE device 107 to receive the second cell-specific common resynchronization signal is represented by signal 312.

In the example of FIG. 1B, the UE device 106 wakes up from a sleep state to check for a page message from the serving base station 102. Upon waking, the UE device 106 warms up its transceiver (e.g., transmitter 218 and receiver 214) and attempts to obtain resynchronization before checking the Physical Downlink Control Channel (PDCCH) for a page message indication. In order to help the UE device 106 obtain resynchronization, the serving base station 102 transmits, via its transmitter 206 and antenna 210, a first cell-specific common resynchronization signal to UE device 106 during a first subframe. Neighboring base station 104 also transmits, via its transmitter 206 and antenna 210, the first cell-specific common resynchronization signal to the UE device 106, which is being served by serving base station 102, during a first subframe.

The transmission of the first cell-specific common resynchronization signal by the neighboring base station 104 occurs by a first timing advance value before the transmission of the first cell-specific common resynchronization signal by the serving base station 102 during a first subframe. For example, base station 104 would transmit the first cell-specific common resynchronization signal, via downlink signal 118 of FIG. 1B, to UE device 106, by a first timing advance value (e.g., a small amount of time) before base station 102 transmits the first cell-specific common resynchronization signal, via downlink signal 117, to UE device 106.

As described above in connection with FIG. 1A, in some examples, the average delay between the time when UE device 106 receives the multipath signals (e.g., first cell-specific common resynchronization signals) from base station 104 and the time when UE device 106 receives the multipath signals from base station 102 is utilized as the first timing advance value by which base station 104 should transmit the first cell-specific common resynchronization signal before base station 102 transmits the first cell-specific common resynchronization signal. The first timing advance value may, in some cases, be determined dynamically by base station 104 before transmitting the first cell-specific common resynchronization signal.

In order to dynamically determine the first timing advance value to be used in conjunction with the first cell-specific common resynchronization signal, the neighboring base station 104 measures an uplink signal (e.g., not shown in FIG. 3B) received from UE device 106, which is located in the service area (e.g., cell 108) of base station 102. Based on one or more signal characteristics (e.g., received signal strength) of the received uplink signal, the neighboring base station 104 utilizes its controller 204 to determine the first timing advance value to be used in conjunction with the first cell-specific common resynchronization signal. The uplink signal may be any suitable signal that enables the neighboring base station 104 to determine the first timing advance value to be used in conjunction with the first cell-specific common resynchronization signal. As mentioned above, in order to facilitate reception of the uplink signal by neighboring base station 104, base station 102 coordinates with neighboring base station 104 to provide information (e.g., a device identifier for UE device 106, time/frequency for the uplink signal transmission, etc.) required by neighboring base station 104 to receive the uplink signal.

In other cases, the first timing advance value is determined as part of the deployment of one or more fixed UE devices and/or base stations. For example, if a neighboring base station 104 is already aware of the distance between the neighboring base station 104 and a location of one or more MTC UE devices 106 (e.g., smart meters in a residential neighborhood, parking meters in an underground parking lot, etc.) being served by a serving base station 102, the neighboring base station 104 can apply a known, fixed timing advance value, based on the distance between the neighboring base station 104 and the MTC UE devices 106, when transmitting a common resynchronization signal that is specific to the base station/cell that is serving the MTC UE devices 106. This known, fixed timing advance (TA) value can be determined as part of the deployment parameters (e.g., when deploying the fixed MTC UE devices and/or neighboring base station). For example, if the neighboring base station's distance, d, from the interested region (e.g., the location of the fixed MTC UE device(s)) is known, then TA=d/c−CP_duration, where c is the speed of light and CP_duration is the duration of the cyclic prefix used for the cell-specific common resynchronization signal transmissions. This determination of the timing advance value during deployment of one or more fixed UE devices and/or base stations is applicable for determining the first timing advance value to be used in conjunction with the first cell-specific common resynchronization signal and/or determining the second timing advance value to be used in conjunction with the second cell-specific common resynchronization signal.

Regardless of the manner in which the first timing advance (TA) value is determined, the neighboring base station 104 transmits, via its transmitter 206 and antenna 210, the first cell-specific common resynchronization signal to UE device 106 by the first timing advance value before the serving base station 102 transmits, via its transmitter 206 and antenna 210, the first cell-specific common resynchronization signal to the UE device 106. As a result, UE device 106 receives the TA-adjusted first cell-specific common resynchronization signals (e.g., multipath signals) from the neighboring base station 104 at approximately the same time that the UE device 106 receives the first cell-specific common resynchronization signals (e.g., multipath signals) from serving base station 102. This allows the receiver 214 of the UE device 106 to use a smaller-sized detection window, achieving a greater timing accuracy resynchronization with lower latency (e.g., fewer number of detection attempts). The neighboring base station 104 transmission of the first cell-specific common resynchronization signal is represented by signal 314 in FIG. 3B. The serving base station 102 transmission of the first cell-specific common resynchronization signal is represented by signal 315 in FIG. 3B.

The first cell-specific common resynchronization signal transmitted by the serving base station 102 and the first cell-specific common resynchronization signal transmitted by the neighboring base station 104 both include (e.g., utilize) a first common sequence. As mentioned above, the first common sequence can be any sequence with special autocorrelation/correlation properties suitable for synchronization signals, such as the Zadoff-Chu (ZC) sequence, for example. In the example shown in FIG. 1B, the transmission of the first cell-specific common resynchronization signal from the serving base station 102 and the transmission of the first cell-specific common resynchronization signal from the neighboring base station 104 both utilize a first common set of time/frequency resources.

In some examples, the transmitter 206 of the serving base station 102 is configured to boost the transmit power of the first cell-specific common resynchronization signal transmission from the serving base station 102. Similarly, in some examples, the transmitter 206 of the neighboring base station 104 is configured to boost the transmit power of the first cell-specific common resynchronization signal transmission from the neighboring base station 104.

The UE device 106 receives, via its antenna 212 and receiver 214, the first cell-specific common resynchronization signal transmitted from the serving base station 102 and the first cell-specific common resynchronization signal transmitted from the neighboring base station 104. The controller 216 of the UE device 106 combines the received first cell-specific common resynchronization signals and utilizes the combined received first cell-specific common resynchronization signals to obtain resynchronization. In some examples, the controller 216 of the UE device 106 coherently combines the received first cell-specific common resynchronization signals, which means that the controller 216 of the UE device 106 utilizes a timing mechanism (e.g., carrier phase information) to receive and then combine the received first cell-specific common resynchronization signals. In some examples, the serving base station 102 also configures the UE device 106, via SIB messaging, with a minimum Signal-to-noise ratio (SNR) threshold value that must be met by the received signal strength of the combined received first cell-specific common resynchronization signals in order to utilize the first cell-specific common resynchronization signals to obtain resynchronization.

Once the received signal strength of the combined received first cell-specific common resynchronization signals results in a Signal-to-noise ratio (SNR) that is sufficient to obtain resynchronization, the UE device 106 will have the correct network timing required to successfully receive and decode the PDCCH to check for a page message indication. If the UE device 106 does not receive a page from the serving base station 102, then the UE device 106 turns OFF its transceiver and re-enters a sleep state. If the UE device 106 does receive a page from the serving base station 102, then the UE device 106 remains ON to receive the subsequent control and data signals.

In the cases in which the controller 216 of the UE device 106 determines that the combined received signal strength value of the combined received first cell-specific common resynchronization signals is below a signal strength threshold value (e.g., below a minimum SNR value), the controller 216 of the UE device 106 will utilize a Primary Synchronization Signal of the serving base station 102 and/or a Secondary Synchronization Signal of the serving base station 102 to obtain resynchronization.

Similar to the UE device 106, the UE device 107 wakes up from a sleep state to check for a page message from base station 104. Upon waking, the UE device 107 warms up its transceiver (e.g., transmitter 218 and receiver 214) and attempts to obtain resynchronization before checking the Physical Downlink Control Channel (PDCCH) for a page message indication. In order to help the UE device 107 obtain resynchronization, base station 104 transmits, via its transmitter 206 and antenna 210, a second cell-specific common resynchronization signal to UE device 107 during a second subframe. Base station 102 also transmits, via its transmitter 206 and antenna 210, the second cell-specific common resynchronization signal to the UE device 107, which is being served by base station 104, during a second subframe.

The transmission of the second cell-specific common resynchronization signal by base station 102 occurs by a second timing advance value before the transmission of the second cell-specific common resynchronization signal by the base station 104 during a second subframe. For example, base station 102 would transmit the second cell-specific common resynchronization signal, via downlink signal 122 of FIG. 1B, to UE device 107, by a second timing advance value (e.g., a small amount of time) before base station 104 transmits the second cell-specific common resynchronization signal, via downlink signal 120, to UE device 107.

As described above, the second timing advance value to be used in conjunction with the second cell-specific common resynchronization signal may be determined dynamically by base station 102 or may be determined during deployment of one or more MTC UE devices 107 and/or one or more base stations 102. In examples in which the second timing advance value to be used in conjunction with the second cell-specific common resynchronization signal is determined dynamically, base station 102 measures an uplink signal (e.g., not shown in FIG. 3B) received from UE device 107, which is located in the service area (e.g., cell 112) of base station 104. Based on one or more signal characteristics (e.g., received signal strength) of the received uplink signal, base station 102 utilizes its controller 204 to determine the second timing advance value to be used in conjunction with the second cell-specific common resynchronization signal. The uplink signal may be any suitable signal that enables base station 102 to determine the second timing advance value to be used in conjunction with the second cell-specific common resynchronization signal. In other cases, the second timing advance value to be used in conjunction with the second cell-specific common resynchronization signal is determined as part of the deployment of one or more fixed UE devices 107 and/or base stations 102, as described above.

Regardless of the manner in which the second timing advance (TA) value is determined, base station 102 transmits, via its transmitter 206 and antenna 210, the second cell-specific common resynchronization signal to UE device 107 by the second timing advance value before base station 104 transmits, via its transmitter 206 and antenna 210, the second cell-specific common resynchronization signal to the UE device 107. As a result, UE device 107 receives the TA-adjusted second cell-specific common resynchronization signals (e.g., multipath signals) from base station 102 at approximately the same time that the UE device 107 receives the second cell-specific common resynchronization signals (e.g., multipath signals) from base station 104. This allows the receiver 214 of the UE device 107 to use a smaller-sized detection window, achieving a greater timing accuracy resynchronization with lower latency (e.g., fewer number of detection attempts). The transmission of the second cell-specific common resynchronization signal from base station 102 is represented by signal 316 in FIG. 3B. The transmission of the second cell-specific common resynchronization signal from base station 104 is represented by signal 317 in FIG. 3B.

The second cell-specific common resynchronization signal transmitted by base station 104 and the second cell-specific common resynchronization signal transmitted by base station 102 both include (e.g., utilize) a second common sequence. As mentioned above, the second common sequence can be any sequence with special autocorrelation/correlation properties suitable for synchronization signals, such as the Zadoff-Chu (ZC) sequence, for example. In the example shown in FIG. 1B, the transmission of the second cell-specific common resynchronization signal from base station 104 and the transmission of the second cell-specific common resynchronization signal from base station 102 both utilize a second common set of time/frequency resources.

In some examples, the transmitter 206 of base station 104 is configured to boost the transmit power of the second cell-specific common resynchronization signal transmission from base station 104. Similarly, in some examples, the transmitter 206 of base station 102 is configured to boost the transmit power of the second cell-specific common resynchronization signal transmission from base station 102.

The UE device 107 receives, via its antenna 212 and receiver 214, the second cell-specific common resynchronization signal transmitted from base station 104 and the second cell-specific common resynchronization signal transmitted from base station 102. The controller 216 of the UE device 107 combines the received second cell-specific common resynchronization signals and utilizes the combined received second cell-specific common resynchronization signals to obtain resynchronization. In some examples, the controller 216 of the UE device 107 coherently combines the received second cell-specific common resynchronization signals, which means that the controller 216 of the UE device 107 utilizes a timing mechanism (e.g., carrier phase information) to receive and then combine the received second cell-specific common resynchronization signals. In some examples, base station 104 also configures the UE device 107, via SIB messaging, with a minimum Signal-to-noise ratio (SNR) threshold value that must be met by the received signal strength of the combined received second cell-specific common resynchronization signals in order to utilize the second cell-specific common resynchronization signals to obtain resynchronization.

Once the received signal strength of the combined received second cell-specific common resynchronization signals results in a Signal-to-noise ratio (SNR) that is sufficient to obtain resynchronization, the UE device 107 will have the correct network timing required to successfully receive and decode the PDCCH to check for a page message indication. If the UE device 107 does not receive a page from base station 104, then the UE device 107 turns OFF its transceiver and re-enters a sleep state. If the UE device 107 does receive a page from base station 104, then the UE device 107 remains ON to receive the subsequent control and data signals.

In the cases in which the controller 216 of the UE device 107 determines that the combined received signal strength value of the combined received second cell-specific common resynchronization signals is below a signal strength threshold value (e.g., below a minimum SNR value), the controller 216 of the UE device 107 will utilize a Primary Synchronization Signal of base station 104 and/or a Secondary Synchronization Signal of base station 104 to obtain resynchronization.

Although the foregoing discussion only included two base stations 102, 104 in the set of base stations that coordinate transmission of the first and second cell-specific common resynchronization signals, communication system 100 may include any suitable number of base stations that can all coordinate with each other to transmit the first and second cell-specific common resynchronization signals. In examples in which there are multiple neighboring base stations transmitting a first cell-specific common resynchronization signal to a UE device 106 being served by serving base station 102, each neighboring base station may have its own unique timing advance value that is used when transmitting the first cell-specific common resynchronization signal via the serving cell-specific Common Synchronization Channel (CSCH). Moreover, although only first and second cell-specific common resynchronization signals were discussed above, any suitable number of common resynchronization signals, each of which is specific to one particular base station or group of base stations, may be used.

In other examples, a first set of base stations (e.g., the serving base station 102 and the neighboring base station 104) may be assigned to a first Common Synchronization Channel (CSCH) area that utilizes a first common sequence in connection with a first common resynchronization signal, and a second set of base stations (not shown) may be assigned to a second CSCH area that utilizes a second common sequence, which is different than the first common sequence, in connection with a second common resynchronization signal.

FIG. 3A is a messaging diagram of an example of the messages exchanged between the various system components shown in FIG. 1A. In this example, base stations 102, 104 coordinate to transmit a first cell-specific common resynchronization signal via a Common Synchronization Channel (CSCH). The first cell-specific common resynchronization signal is specific to base station 102. The neighboring base station 104 transmits the first cell-specific common resynchronization signal by a timing advance value before the serving base station 102 transmits the first cell-specific common resynchronization signal.

In order to prepare UE device 106 to receive the first cell-specific common resynchronization signal, serving base station 102 broadcasts information required by UE device 106 to receive the first cell-specific common resynchronization signal, via signal 302. The common resynchronization signal information is information required by UE device 106 to receive the first cell-specific common resynchronization signal that will be transmitted from both base stations 102, 104. The common resynchronization signal information may include time/frequency resource location information for the CSCH over which the first cell-specific common resynchronization signal will be transmitted and/or information regarding the common sequence that will be included within the first cell-specific common resynchronization signal.

As described above, in some examples, the neighboring base station 104 dynamically determines a timing advance value by which the neighboring base station 104 will transmit the first cell-specific common resynchronization signal before the serving base station 102 transmits the first cell-specific common resynchronization signal. In these cases, the neighboring base station 104 utilizes an uplink signal 303 received from the UE device 106 to dynamically determine the timing advance value. However, in other examples, the timing advance value is determined during deployment of the UE device 106 and/or the neighboring base station 104. In these cases, the timing advance value is based on the distance between the UE device 106 and the neighboring base station 104.

Regardless of how the timing advance value is determined, neighboring base station 104 transmits the first cell-specific common resynchronization signal to UE device 106, via signal 304, by a timing advance value before serving base station 102 transmits the first cell-specific common resynchronization signal to UE device 106, via signal 305. As described above, the UE device 106 utilizes the combined received first cell-specific common resynchronization signals to obtain resynchronization.

In some examples, after obtaining resynchronization, UE device 106 utilizes a Primary Synchronization Signal (PSS) from base station 102 and/or a Secondary Synchronization Signal (SSS) from base station 102 to obtain an identifier associated with base station 102. The signal containing the PSS/SSS transmitted from base station 102 to the UE device 106 is represented by signal 306 in FIG. 3A.

FIG. 3B is a messaging diagram of an example of the messages exchanged between the various system components shown in FIG. 1B. In this example, base stations 102, 104 coordinate to transmit (1) a first cell-specific common resynchronization signal via a first Common Synchronization Channel (CSCH) during a first subframe, and (2) a second cell-specific common resynchronization signal via a second Common Synchronization Channel (CSCH) during a second subframe. The first cell-specific common resynchronization signal is specific to base station 102, and the second cell-specific common resynchronization signal is specific to base station 104. The neighboring base station 104 transmits the first cell-specific common resynchronization signal by a first timing advance value before the serving base station 102 transmits the first cell-specific common resynchronization signal. Likewise, base station 102 transmits the second cell-specific common resynchronization signal by a second timing advance value before base station 104 transmits the second cell-specific common resynchronization signal.

In this example, base station 102 transmits a first cell-specific common resynchronization signal information signal to UE device 106, via signal 310. The first cell-specific common resynchronization signal information is information required by UE device 106 to receive the first cell-specific common resynchronization signal that is transmitted from both base stations 102, 104 during a first subframe. The first cell-specific common resynchronization signal information may include time/frequency resource location information for the first cell-specific CSCH over which the first cell-specific common resynchronization signal will be transmitted and/or information regarding the first common sequence that will be included within the first cell-specific common resynchronization signal.

Similarly, base station 104 transmits a second cell-specific common resynchronization signal information signal to UE device 107, via signal 312. The second cell-specific common resynchronization signal information is information required by UE device 107 to receive the second cell-specific common resynchronization signal that is transmitted from both base stations 102, 104 during a second subframe. The second cell-specific common resynchronization signal information may include time/frequency resource location information for the second cell-specific CSCH over which the second cell-specific common resynchronization signal will be transmitted and/or information regarding the second common sequence that will be included within the second cell-specific common resynchronization signal.

As described above, in some examples, the neighboring base station 104 dynamically determines a first timing advance value by which the neighboring base station 104 will transmit the first cell-specific common resynchronization signal before the serving base station 102 transmits the first cell-specific common resynchronization signal. In these cases, the neighboring base station 104 utilizes an uplink signal (e.g., not shown in FIG. 3B) received from the UE device 106 to dynamically determine the first timing advance value. However, in other examples, the first timing advance value is determined during deployment of the UE device 106 and/or the neighboring base station 104. In these cases, the first timing advance value is based on the distance between the UE device 106 and the neighboring base station 104.

Regardless of how the first timing advance value is determined, neighboring base station 104 transmits the first cell-specific common resynchronization signal to UE device 106, via signal 314, by the first timing advance value before serving base station 102 transmits the first cell-specific common resynchronization signal to UE device 106, via signal 315. As described above, the UE device 106 utilizes the combined received first cell-specific common resynchronization signals to obtain resynchronization.

As described above, in some examples, the base station 102 dynamically determines a second timing advance value by which base station 102 will transmit the second cell-specific common resynchronization signal before base station 104 transmits the second cell-specific common resynchronization signal. In these cases, the base station 102 utilizes an uplink signal (e.g., not shown in FIG. 3B) received from the UE device 107 to dynamically determine the second timing advance value. However, in other examples, the second timing advance value is determined during deployment of the UE device 107 and/or base station 102. In these cases, the second timing advance value is based on the distance between the UE device 107 and base station 102.

Regardless of how the second timing advance value is determined, base station 102 transmits the second cell-specific common resynchronization signal to UE device 107, via signal 316, by the second timing advance value before base station 104 transmits the second cell-specific common resynchronization signal to UE device 107, via signal 317. As described above, the UE device 107 utilizes the combined received second cell-specific common resynchronization signals to obtain resynchronization.

Figure 4:
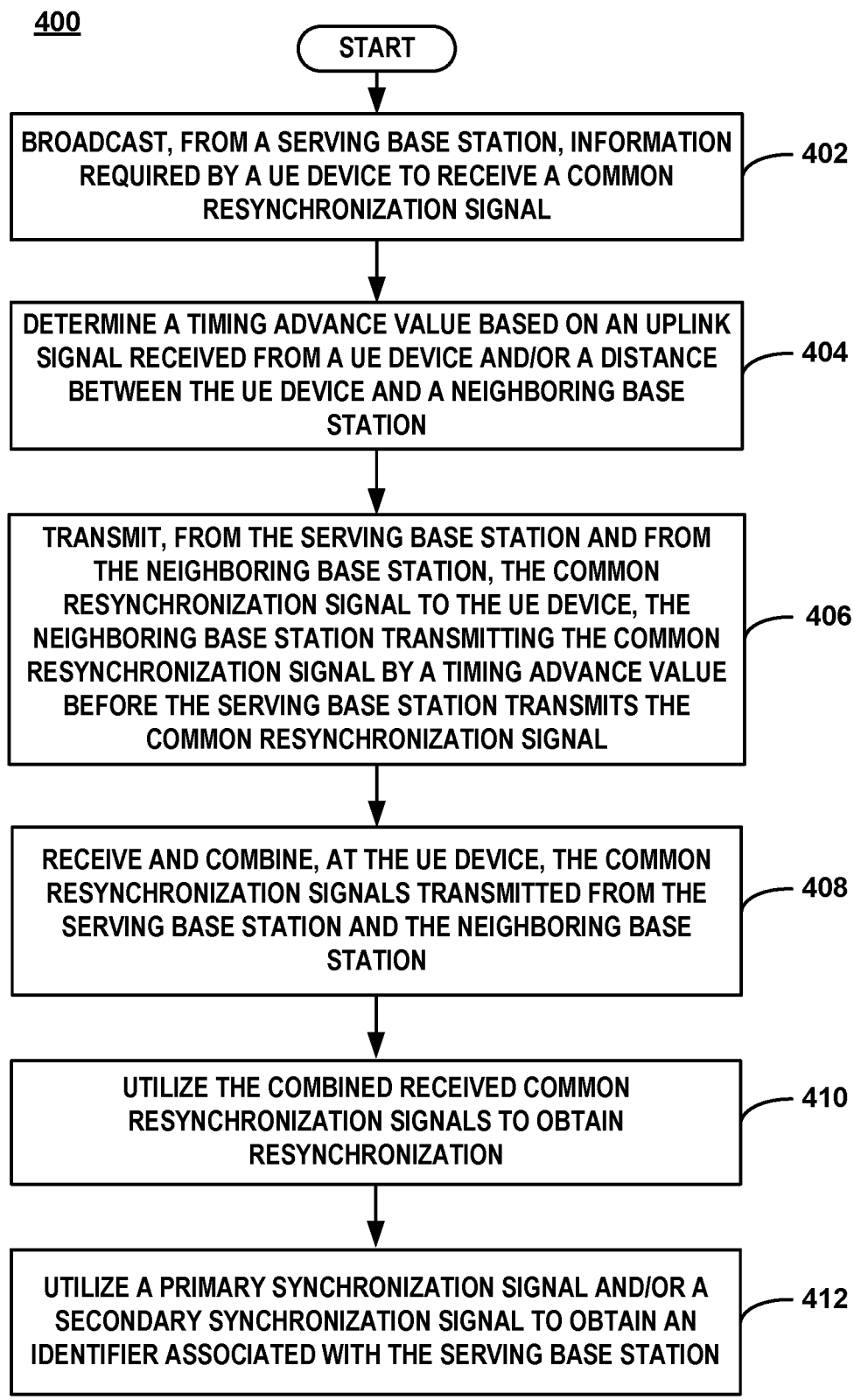
FIG. 4 is a flowchart of an example of a method in which a serving base station and a neighboring base station both transmit a cell-specific common resynchronization signal.

FIG. 4 is a flowchart of an example of a method in which a serving base station and a neighboring base station both transmit a cell-specific common resynchronization signal. The neighboring base station transmits the first cell-specific common resynchronization signal by a timing advance value before the serving base station transmits the first cell-specific common resynchronization signal. The method 400 begins at step 402 with broadcasting, from serving base station 102, information required by UE device 106 to receive a first cell-specific common resynchronization signal. At step 404, neighboring base station 104 determines a timing advance value based on (1) an uplink signal received from UE device 106, and/or (2) a distance between the UE device 106 and the neighboring base station 104. At step 406, the neighboring base station 104 transmits the first cell-specific common resynchronization signal by the timing advance value before the serving base station 102 transmits the first cell-specific common resynchronization signal. At step 408, the UE device 106 receives and combines the first cell-specific common resynchronization signals transmitted from the serving base station 102 and the neighboring base station 104. At step 410, the UE device 106 utilizes the combined received first cell-specific common resynchronization signals to obtain resynchronization. At step 412, the UE device 106 utilizes a PSS and/or an SSS from the serving base station 102 to obtain an identifier associated with the serving base station 102.

FIG. 5 is a flowchart of an example of a method in which a serving base station and a neighboring base station both transmit a first cell-specific common resynchronization signal during a first subframe. The neighboring base station transmits the first cell-specific common resynchronization signal by a first timing advance value before the serving base station transmits the first cell-specific common resynchronization signal. The serving base station and the neighboring base station both transmit a second cell-specific common resynchronization signal during a second subframe. The serving base station transmits the second cell-specific common resynchronization signal by a second timing advance value before the neighboring base station transmits the second cell-specific common resynchronization signal.

The method 500 begins at step 502 with base station 102 and base station 104 both transmitting, during a first subframe, a first cell-specific common resynchronization signal to first UE device 106. The neighboring base station 104 transmits the first cell-specific common resynchronization signal by a first timing advance value before the serving base station 102 transmits the first cell-specific common resynchronization signal. The transmission of the first cell-specific common resynchronization signal from base station 102 and the transmission of the first cell-specific common resynchronization signal from base station 104 both utilize a first common sequence, which comprises an identifier associated with base station 102, and a first common set of time/frequency resources. At step 504, base station 104 and base station 102 both transmit, during a second subframe, a second cell-specific common resynchronization signal to second UE device 107. Base station 102 transmits the second cell-specific common resynchronization signal by a second timing advance value before base station 104 transmits the second cell-specific common resynchronization signal. The transmission of the second cell-specific common resynchronization signal from base station 104 and the transmission of the second cell-specific common resynchronization signal from base station 102 both utilize a second common sequence, which comprises an identifier associated with base station 104, and a second common set of time/frequency resources.

At step 506, the first UE device 106 receives and combines the first cell-specific common resynchronization signals transmitted from base station 102 and base station 104, and the second UE device 107 receives and combines the second cell-specific common resynchronization signals transmitted from base station 104 and base station 102. At step 508, the first UE device 106 utilizes the combined received first cell-specific common resynchronization signals to obtain resynchronization, and the second UE device 107 utilizes the combined received second cell-specific common resynchronization signals to obtain resynchronization.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
   transmitting at least one common resynchronization signal from a serving base station to a user equipment (UE) device being served by the serving base station;
   transmitting the at least one common resynchronization signal from a neighboring base station to the UE device, the at least one common resynchronization signal transmitted from the neighboring base station by a timing advance value before the at least one common resynchronization signal is transmitted from the serving base station; and
   receiving, by the UE device, the common resynchronization signal transmitted from the serving base station;
   receiving, by the UE device, the common resynchronization signal transmitted from the neighboring base station;
   combining, by the UE device, the received common resynchronization signals.

2. The method of claim 1, wherein the common resynchronization signal transmission from the serving base station and the common resynchronization signal transmission from the neighboring base station utilize at least one common sequence.

3. The method of claim 2, wherein the common resynchronization signal transmission from the serving base station and the common resynchronization signal transmission from the neighboring base station utilize a common set of time/frequency resources.

4. The method of claim 3, further comprising:
utilizing at least one of the following to obtain an identifier associated with the serving base station: a Primary Synchronization Signal and a Secondary Synchronization Signal.

5. The method of claim 2, wherein, during a first subframe, a first common sequence comprises a first identifier that is associated with the serving base station, and wherein transmission of a first common resynchronization signal from the serving base station and transmission of the first common resynchronization signal from the neighboring base station both utilize a first common set of time/frequency resources during the first subframe, the first common resynchronization signal transmitted from the neighboring base station by a first timing advance value before the first common resynchronization signal is transmitted from the serving base station, and
wherein, during a second subframe, a second common sequence comprises a second identifier that is associated with the neighboring base station, and wherein transmission of a second common resynchronization signal from the serving base station and transmission of the second common resynchronization signal from the neighboring base station both utilize a second common set of time/frequency resources during the second subframe, the second common resynchronization signal transmitted from the serving base station by a second timing advance value before the second common resynchronization signal is transmitted from the neighboring base station.

6. The method of claim 1, further comprising:
broadcasting, by the serving base station, information required by the UE device to receive the common resynchronization signal.

7. The method of claim 6, wherein the information comprises at least one of the following: time/frequency resource location information and sequence information.

8. The method of claim 1, further comprising:
utilizing, by the UE device, the combined received common resynchronization signals to obtain resynchronization.

9. The method of claim 1, further comprising:
determining that a combined received signal strength value of the combined received common resynchronization signals is below a signal strength threshold value; and
utilizing at least one of the following to obtain resynchronization: a Primary Synchronization Signal and a Secondary Synchronization Signal.

10. The method of claim 1, further comprising:
boosting a transmit power of at least one of the following: the common resynchronization signal transmission from the serving base station and the common resynchronization signal transmission from the neighboring base station.

11. The method of claim 1, further comprising:
assigning the serving base station and the neighboring base station to a first Common Synchronization Channel (CSCH) area that utilizes a first common sequence that is different than a second common sequence utilized by a second CSCH area.

12. The method of claim 1, further comprising:
determining the timing advance value based on an uplink signal received from the UE device.

13. The method of claim 1, wherein the timing advance value is based on a distance between the UE device and the neighboring base station.

14. The method of claim 1, wherein the combining, by the UE device, the received common resynchronization signals comprises coherently combining, by the UE device, the received common resynchronization signals.

15. A system comprising:
a serving base station comprising a transmitter configured to transmit at least one common resynchronization signal;
a neighboring base station comprising a transmitter configured to transmit the at least one common resynchronization signal by a timing advance value before the at least one common resynchronization signal is transmitted from the serving base station; and
a user equipment (UE) device comprising a receiver configured to receive the common resynchronization signal transmitted from the serving base station and the common resynchronization signal transmitted from the neighboring base station, the UE device comprising a controller configured to combine the received common resynchronization signals.

16. The system of claim 15, wherein the transmitter of the serving base station and the transmitter of the neighboring base station are configured to utilize at least one common sequence when transmitting the common resynchronization signal.

17. The system of claim 16, wherein the transmitter of the serving base station and the transmitter of the neighboring base station are configured to utilize a common set of time/frequency resources when transmitting the common resynchronization signal.

18. The system of claim 17, wherein the controller is further configured to utilize at least one of the following to obtain an identifier associated with the serving base station: a Primary Synchronization Signal and a Secondary Synchronization Signal.

19. The system of claim 16, wherein, during a first subframe, a first common sequence comprises a first identifier that is associated with the serving base station, and wherein the transmitter of the serving base station and the transmitter of the neighboring base station are configured to utilize a first common set of time/frequency resources when transmitting a first common resynchronization signal during the first subframe, and
wherein, during a second subframe, a second common sequence comprises a second identifier that is associated with the neighboring base station, and wherein the transmitter of the serving base station and the transmitter of the neighboring base station are configured to utilize a second common set of time/frequency resources when transmitting a second common resynchronization signal during the second subframe.

20. The system of claim 15, wherein the transmitter of the serving base station is further configured to broadcast information required by the UE device to receive the common resynchronization signal.

21. The system of claim 20, wherein the information comprises at least one of the following: time/frequency resource location information and sequence information.

22. The system of claim 15, wherein the controller of the UE device is further configured to utilize the combined received common resynchronization signals to obtain resynchronization.

23. The system of claim 15, wherein the controller of the UE device is further configured to:
   determine that a combined received signal strength value of the combined received common resynchronization signals is below a signal strength threshold value, and
   utilize at least one of the following to obtain resynchronization: a Primary Synchronization Signal and a Secondary Synchronization Signal.

24. The system of claim 15, wherein the transmitters of the serving base station and the neighboring base station are configured to boost a transmit power of the common resynchronization signal transmissions.

25. The system of claim 15, further comprising:
   a first Common Synchronization Channel (CSCH) area in which the serving base station and the neighboring base station transmit the common resynchronization signal utilizing a first common sequence that is different than a second common sequence utilized in a second CSCH area.

26. The system of claim 15, wherein the neighboring base station further comprises a controller configured to determine the timing advance value based on an uplink signal received from the UE device.

27. The system of claim 15, wherein the timing advance value is based on a distance between the UE device and the neighboring base station.

28. The system of claim 15, wherein the controller is configured to coherently combine the received common resynchronization signals.

29. A user equipment (UE) device comprising:
   a receiver configured to:
      receive a common resynchronization signal transmitted from a serving base station, and
      receive the common resynchronization signal transmitted from a neighboring base station, the common resynchronization signal transmitted from the neighboring base station by a timing advance value before the common resynchronization signal is transmitted from the serving base station; and
   a controller configured to combine the received common resynchronization signals.

30. The UE device of claim 29, wherein the controller is configured to coherently combine the received common resynchronization signals.

* * * * *